US012627152B2

(12) United States Patent
Ke et al.

(10) Patent No.: US 12,627,152 B2
(45) Date of Patent: May 12, 2026

(54) POWER SYSTEM AND POWER CONTROL METHOD

(71) Applicant: DELTA ELECTRONICS, INC., Taoyuan City (TW)

(72) Inventors: Yi-Kuan Ke, Taoyuan City (TW); Hong-Jhih Liu, Taoyuan City (TW); Meng-Jia Liu, Taoyuan City (TW); Chia-Ching Lin, Taoyuan City (TW)

(73) Assignee: DELTA ELECTRONICS, INC., Taoyuan City (TW)

( * ) Notice: Subject to any disclaimer, the term of this patent is extended or adjusted under 35 U.S.C. 154(b) by 88 days.

(21) Appl. No.: 18/507,746

(22) Filed: Nov. 13, 2023

(65) Prior Publication Data

US 2025/0055281 A1 Feb. 13, 2025

(30) Foreign Application Priority Data

Aug. 8, 2023 (CN) .......................... 202310990882.X

(51) Int. Cl.
*H02J 3/32* (2026.01)
*H02J 3/02* (2026.01)
*H02J 3/46* (2026.01)
*H02J 7/00* (2026.01)
*H02J 9/06* (2006.01)

(52) U.S. Cl.
CPC .................................... *H02J 3/32* (2013.01); *H02J 3/02* (2013.01); *H02J 3/46* (2013.01); *H02J 7/00032* (2020.01); *H02J 7/00712* (2020.01); *H02J 9/061* (2013.01); *H02J 2207/20* (2020.01); *H02J 2300/24* (2020.01)

(58) Field of Classification Search
CPC ........ H02J 3/32; H02J 3/02; H02J 3/46; H02J 7/00032; H02J 7/00712; H02J 9/061; H02J 2207/20; H02J 2300/24; H02J 3/381; H02J 7/35
See application file for complete search history.

(56) References Cited

U.S. PATENT DOCUMENTS

| | | | |
|---|---|---|---|
| 10,254,332 B2 | 4/2019 | Frigoli et al. | |
| 2008/0039979 A1* | 2/2008 | Bridges | ................... B60L 55/00 |
| | | | 700/286 |
| 2011/0101778 A1 | 5/2011 | Yang | |

(Continued)

FOREIGN PATENT DOCUMENTS

| | | |
|---|---|---|
| CN | 104868493 A | 8/2015 |
| CN | 208297627 U | 12/2018 |

(Continued)

*Primary Examiner* — Daniel Cavallari
*Assistant Examiner* — Thai H Tran
(74) *Attorney, Agent, or Firm* — CKC & Partners Co., LLC

(57) ABSTRACT

A power system includes a power conversion circuit, a DC converter and an inverter. The power conversion circuit is coupled to a AC supply line and a DC supply line to convert voltage between the AC supply line and the DC supply line. The DC converter is coupled to the DC supply line and a charging device. The inverter is coupled to the AC supply line and the charging device. When the charging device provides a supply power to the inverter, the inverter is configured to convert the supply power into a recovered power and transmit the recovered power to the power conversion circuit.

17 Claims, 5 Drawing Sheets

(56)        References Cited

U.S. PATENT DOCUMENTS

| 2012/0181990 A1* | 7/2012 | Asakura | H02J 5/00 |
| | | | 320/137 |
| 2018/0029486 A1* | 2/2018 | Pfeilschifter | B60L 53/20 |
| 2020/0023747 A1* | 1/2020 | Logvinov | B60L 53/63 |
| 2024/0286501 A1* | 8/2024 | Oberrauch | B60L 1/006 |

FOREIGN PATENT DOCUMENTS

| CN | 111313528 A | 6/2020 |
| CN | 113098121 A | 7/2021 |
| CN | 113972731 A | 1/2022 |
| EP | 3799244 A1 | 3/2021 |
| JP | 6266303 | 1/2018 |
| TW | I446674 B | 7/2014 |
| TW | 201502550 A | 1/2015 |
| TW | I533556 B | 5/2016 |
| TW | I559648 B | 11/2016 |
| TW | I562505 B | 12/2016 |
| TW | I712241 B | 12/2020 |

* cited by examiner

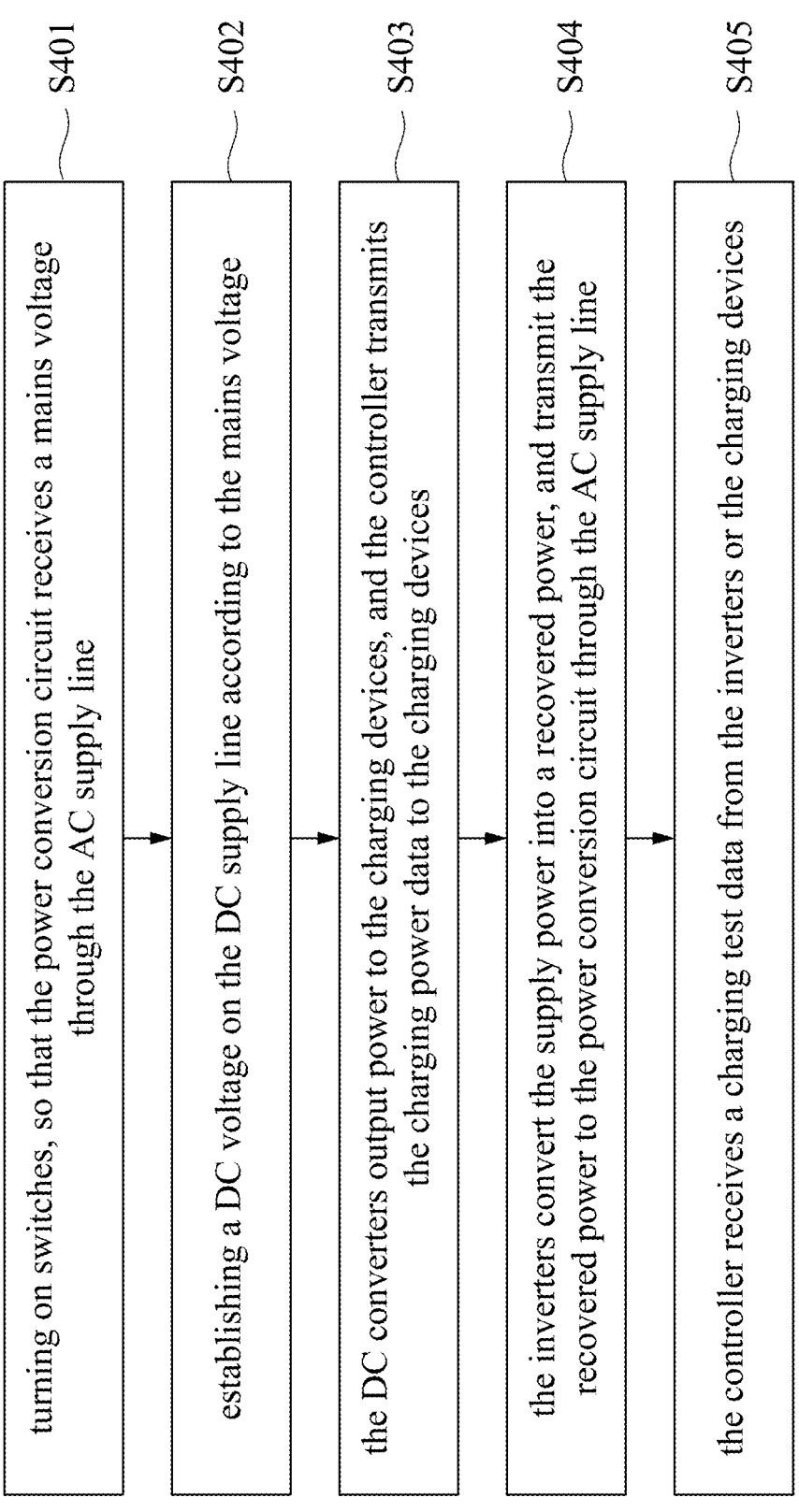

S401 turning on switches, so that the power conversion circuit receives a mains voltage through the AC supply line

S402 establishing a DC voltage on the DC supply line according to the mains voltage

S403 the DC converters output power to the charging devices, and the controller transmits the charging power data to the charging devices

S404 the inverters convert the supply power into a recovered power, and transmit the recovered power to the power conversion circuit through the AC supply line

S405 the controller receives a charging test data from the inverters or the charging devices

Fig. 4

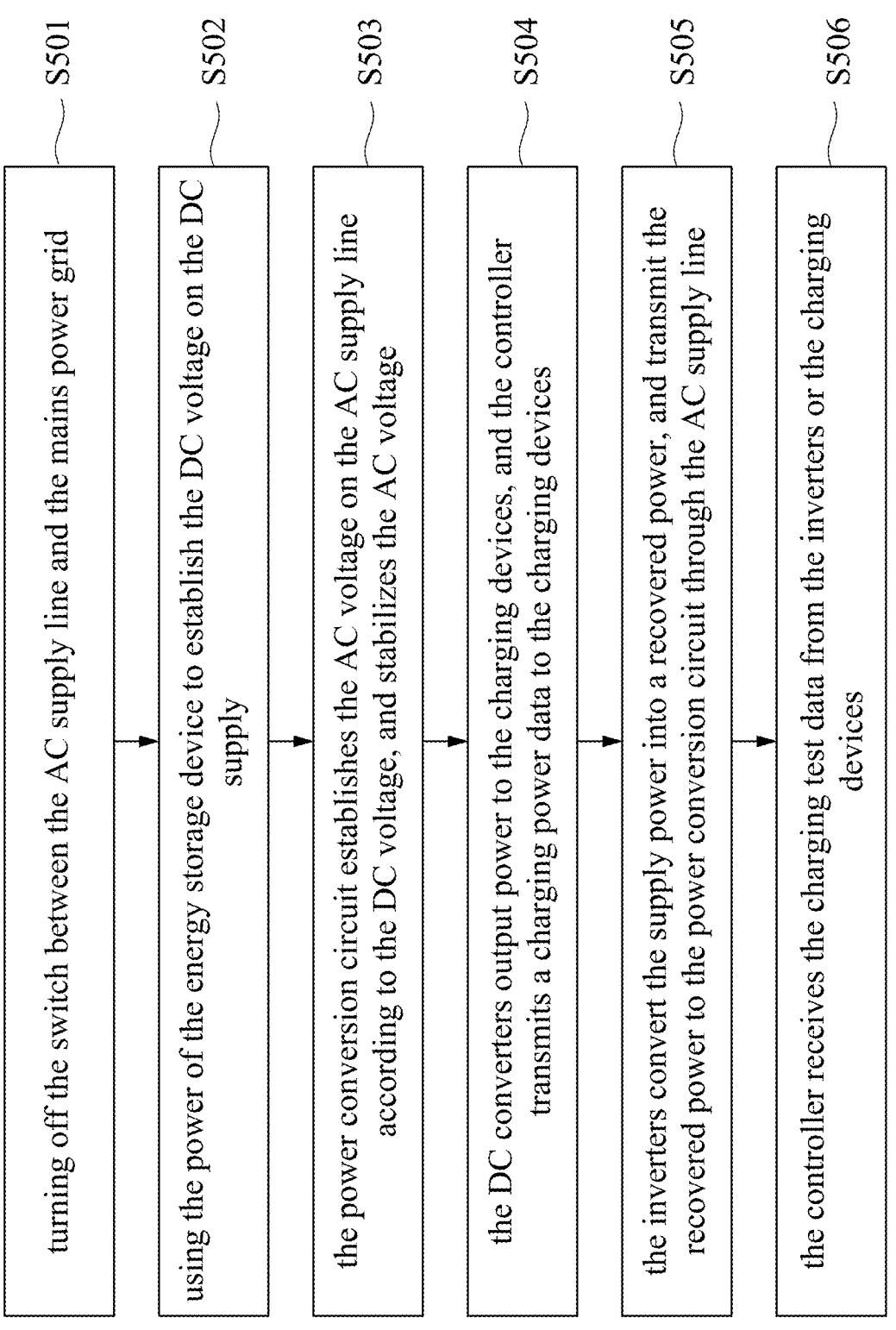

S501 turning off the switch between the AC supply line and the mains power grid

S502 using the power of the energy storage device to establish the DC voltage on the DC supply S503 the power conversion circuit establishes the AC voltage on the AC supply line according to the DC voltage, and stabilizes the AC voltage S504 the DC converters output power to the charging devices, and the controller transmits a charging power data to the charging devices S505 the inverters convert the supply power into a recovered power, and transmit the recovered power to the power conversion circuit through the AC supply line S506 the controller receives the charging test data from the inverters or the charging devices

Fig. 5

POWER SYSTEM AND POWER CONTROL METHOD

CROSS-REFERENCE TO RELATED APPLICATION

This application claims priority to China Application Serial Number 202310990882.X, filed Aug. 8, 2023, which is herein incorporated by reference in its entirety.

BACKGROUND

Technical Field

The present disclosure relates to a power management technology, specifically a power system and power control method.

Description of Related Art

Electrical energy is generated from power stations, converted and supplied to industrial/commercial and household users by a mains power grid. However, mains power lines may cause unstable power supply due to unpredictable variables. For users with large power demand or extremely high demand for power supply stability, in order to improve the stability of power consumption, auxiliary microgrids can be established outside the mains grid to optimize or manage power.

SUMMARY

One aspect of the present disclosure is a power system, comprising a power conversion circuit, at least one DC converter and at least one inverter. The power conversion circuit is coupled to an AC supply line and a DC supply line, and is configured to convert a voltage between the AC supply line and the DC supply line. The at least one DC converter is coupled to the DC supply line and at least one charging device. The at least one inverter is coupled to the AC supply line and the at least one charging device. When the at least one charging device provides a supply power to the at least one inverter, the at least one inverter is configured to convert the supply power into a recovered power and transmit the recovered power to the power conversion circuit.

Another aspect of the present disclosure is a power control method, comprising: stabilizing, by a power conversion circuit, a DC voltage of a DC supply line according to an AC voltage of an AC supply line, and transmitting the DC voltage to at least one DC converter, wherein the at least one DC converter is configured to provide the DC voltage to at least one charging device; connecting at least one inverter to the at least one charging device to receive a supply power outputted by the at least one charging device; and converting, by the at least one inverter, the supply power to a recovered power, and transmitting the recovered power to the power conversion circuit through the AC supply line.

Another aspect of the present disclosure is a power system, comprising a power conversion circuit, a plurality of DC converters and a controller. The power conversion circuit is coupled to an AC supply line and a DC supply line, and is configured to convert a voltage between the AC supply line and the DC supply line. The plurality of DC converters is coupled to the power conversion circuit through the DC supply line. The controller is coupled between the power conversion circuit and the plurality of DC converters. When an AC voltage is established on the AC supply line, the controller is configured to control the power conversion circuit to stabilize a DC voltage on the DC supply line according to the AC voltage, so as to output or receive power by the plurality of DC converters.

The present disclosure uses a DC coupling architecture to establish a power grid (microgrid), allowing the power conversion circuit to control power more stably. In addition, using a power recovery path formed by the inverter, the power system can simulate and detect load and operating conditions in a low-consumption state.

It is to be understood that both the foregoing general description and the following detailed description are by examples, and are intended to provide further explanation of the disclosure as claimed.

BRIEF DESCRIPTION OF THE DRAWINGS

The present disclosure can be more fully understood by reading the following detailed description of the embodiment, with reference made to the accompanying drawings as follows:

FIG. 4 is a flowchart illustrating a power control method in some embodiments of the present disclosure.

FIG. 5 is a flowchart illustrating a power control method in some embodiments of the present disclosure.

DETAILED DESCRIPTION

For the embodiment below is described in detail with the accompanying drawings, embodiments are not provided to limit the scope of the present disclosure. Moreover, the operation of the described structure is not for limiting the order of implementation. Any device with equivalent functions that is produced from a structure formed by a recombination of elements is all covered by the scope of the present disclosure. Drawings are for the purpose of illustration only, and not plotted in accordance with the original size.

It will be understood that when an element is referred to as being "connected to" or "coupled to", it can be directly connected or coupled to the other element or intervening elements may be present. In contrast, when an element to another element is referred to as being "directly connected" or "directly coupled," there are no intervening elements present. As used herein, the term "and/or" includes an associated listed items or any and all combinations of more.

The present disclosure relates to a power system and power control method, which can be applied to establish a microgrid to provide power to multiple electrical devices, or to manage the power of electrical devices.

Figure 1:
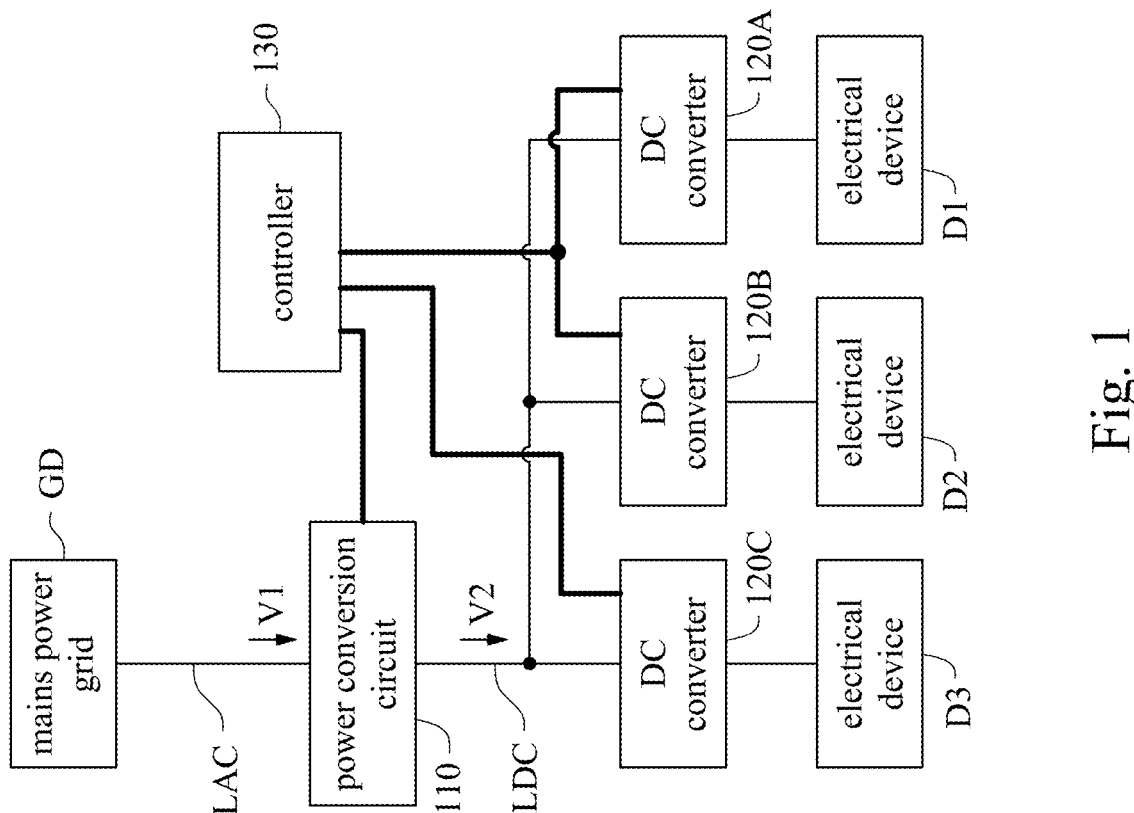
FIG. 1 is a schematic diagram of a power system in some embodiments of the present disclosure.

FIG. 1 is a schematic diagram of a power system 100 in some embodiments of the present disclosure. The power system 100 includes a power conversion circuit 110, at least one DC converter (DC converters 120A-120C) and a controller 130. The power conversion circuit 110 is respectively coupled to an AC supply line LAC and a DC supply line LDC, and is configured to receive a mains voltage form a mains power grid GD, so that an AC voltage V1 is formed on the AC supply line LAC. The power conversion circuit 110 converts the AC voltage V1, and establish a DC voltage V2 on the DC supply line LDC.

In some embodiments, the power conversion circuit 110 can be a AC-DC converter, and is configured to receive the AC voltage V1 to output specific DC voltage V2, so as to stabilize the DC supply line LDC. The operation of the AC-DC converter will be apparent to those of ordinary skill in the art in view of the teachings herein, which will not be described here.

The DC converters 120A-120C is coupled to the power conversion circuit 110 through the DC supply line LDC, and is further configured to be connected to multiple electrical devices D1-D3 to provide power to or from the electrical devices D1-D3 receive power. In some embodiments, the electrical devices D1-D3 may be charging stations (charging piles) for electric vehicles, rechargeable batteries or solar panels. The DC converters 120A-120C is configured to convert the DC voltage V2 to a working voltage that matches requirements of electrical devices D1-D3.

The controller 130 is coupled to the power conversion circuit 110 and the DC converters 120A-120C, and is configured to drive (enable, turn on) or disable (shut down, turn off) the power conversion circuit 110 and the DC converters 120A-120C. In some embodiments, when a stable AC voltage V1 has been established/formed on the AC supply line LAC, the controller 130 is configured to control the power conversion circuit 110 to stabilize the DC voltage V2 on the DC supply line LDC according to the AC voltage V1, and enable the DC converters 120A-120C to output energy or receive energy. The method of establishing the AC voltage on the AC supply line LAC is explained in the subsequent paragraphs.

The power system 100 shown in FIG. 1 is coupled to the AC supply line LAC through the power conversion circuit 110, and the power conversion circuit 110 is coupled to multiple DC converters 120A-120C through the DC supply line LDC. In other words, the power system 100 is connected to the electrical devices D1-D3 through a DC coupling architecture formed by "the power conversion circuit 110, the DC supply line, the DC converters 120A-120C". Since the DC voltage V2 transmits power without involving frequency, the power conversion circuit 110 only needs to control the DC voltage V2 on the DC supply line LDC to stabilize the DC supply line LDC, so it has higher controllability and stability.

Figure 2:
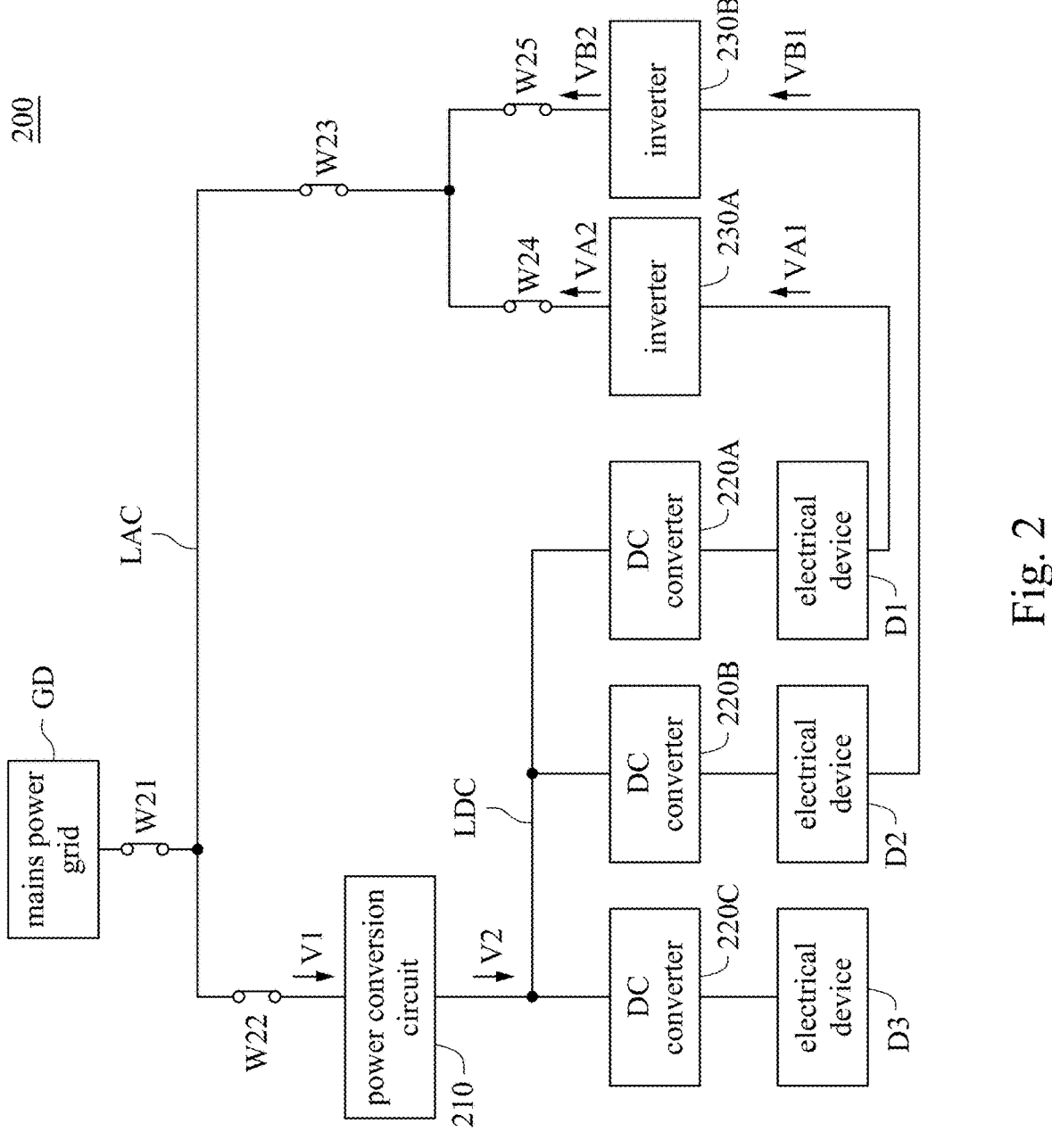
FIG. 2 is a schematic diagram of a power system in some embodiments of the present disclosure.

FIG. 2 is a schematic diagram of a power system 200 in some embodiments of the present disclosure. In FIG. 2, the similar components associated with the embodiment of FIG. 1 are labeled with the same numerals for ease of understanding. The specific principle of the similar component has been explained in detail in the previous paragraphs, and unless it has a cooperative relationship with the components of FIG. 2, it is not repeated here.

The power system 200 includes a power conversion circuit 210, at least one DC converter (DC converters 220A-220C) and at least one inverter (inverters 230A-230B). The power conversion circuit 210 is respectively coupled to the AC supply line LAC and the DC supply line LDC, and is configured to receive a mains voltage from a mains power grid GD, so that an AC voltage V1 is formed on the AC supply line LAC. In some embodiments, the power conversion circuit 210 can be a bidirectional AC-DC converter, which is configured to convert a voltage between the AC supply line LAC and the DC supply line LDC to transmit the AC voltage V1 or the DC voltage V2.

The DC converters 220A-220C are coupled to the power conversion circuit 210 through the DC supply line LDC, and are coupled to multiple electrical devices D1-D3. In some embodiments, the DC converters 220A-220C may be bidirectional DC-DC conversion circuits, and are configured to convert the DC voltage V2 of the DC supply line LDC, and outputs a working voltage that matches the requirements of the electrical devices D1-D3. In some other embodiments, the DC converters are configured to receive the power provided by the electrical devices D1-D3 (e.g., solar panels, batteries), and converts the power to output a voltage that matches the power transmission specifications on the DC supply line LDC.

The inverters 230A-230B are coupled to the AC supply line LAC, and are coupled to the electrical devices D1-D2 through the power transmission line to form a power recovery path. When the electrical devices D1-D2 output a supply power to the inverters 230A-230B, the DC-AC conversion circuit (e.g., converter, rectifier) contained in the inverters 230A-230B is configured to convert the supply power into a recovered power, and transmit the recovered power through the AC supply line LAC To the power conversion circuit 210, to complete an power recovery.

The power system 200 shown in FIG. 2 can be used for power supply management or to detect the performance of the electrical devices D1-D3. For example, the electrical devices D1-D2 can be charging stations for electric vehicles, when detecting the power supply efficiency of the power system 200 applied to charging stations, in order to avoid energy waste, the power system 200 receives the supply power VA1 and VB1 output by the electrical devices D1-D2 (charging stations) during simulated charging through the inverters 230A-230B. The inverters 230A-230B receive the supply power VA1, VB1, and convert the supply power VA1, VB1 into the recovered power VA2, VB2. Then, the inverters 230A-230B transmit the recovered power VA2, VB2 back to the power conversion circuit 210 through the AC supply line LAC.

During the simulation and power recovery process, the power system 200 can connect the power conversion circuit 210 and the inverters 230A-230B to the AC supply line LAC (or the mains power grid GD) through the control switches W21-W25. In other embodiments, switches W21-W25 may be disposed in the power conversion circuit 210 and the inverters 230A-230B, or controlled by the power conversion circuit 210 and the inverters 230A-230B respectively. The detailed control method of switches will be explained in the subsequent paragraphs.

Figure 3:
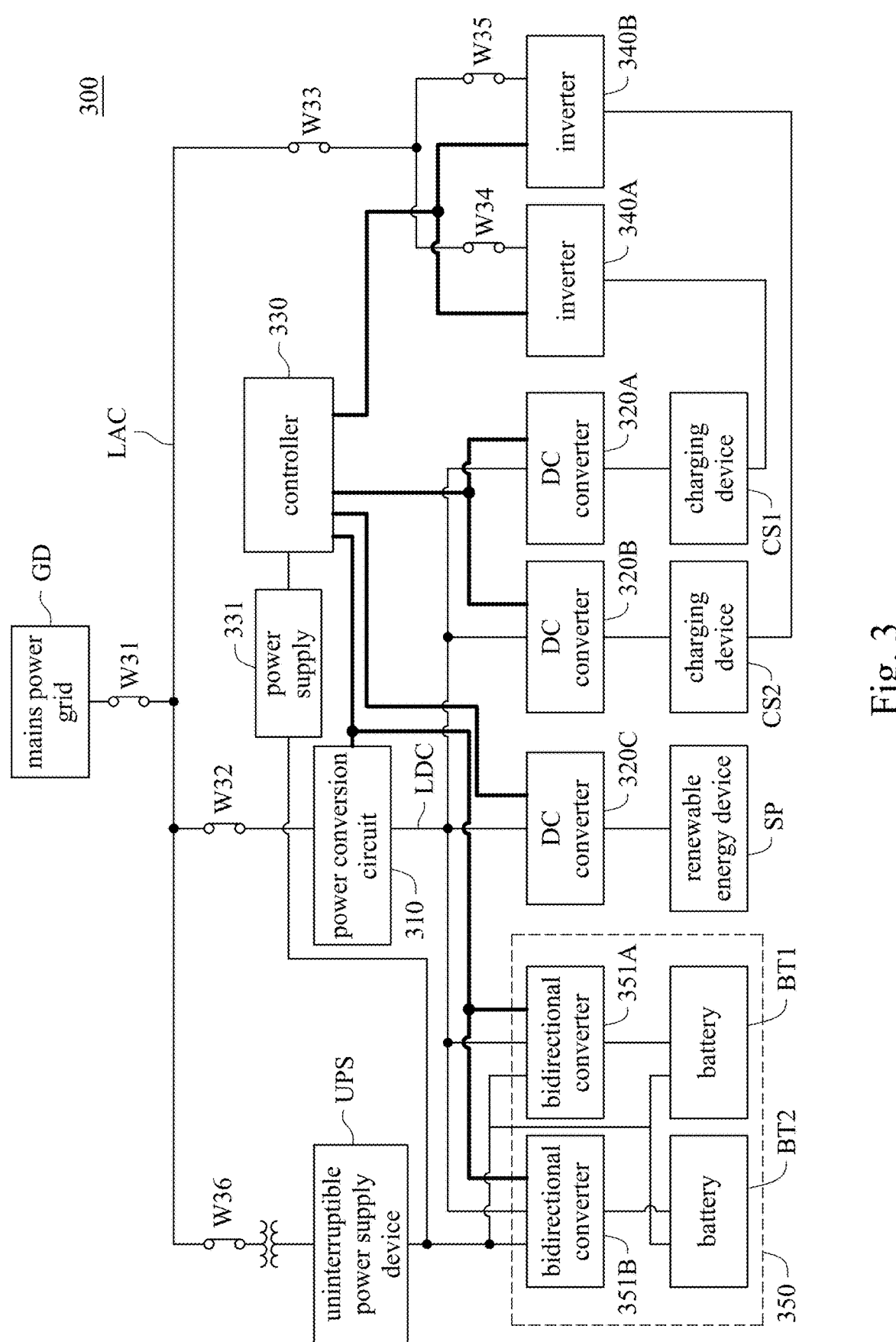
FIG. 3 is a schematic diagram of a power system in some embodiments of the present disclosure.

FIG. 3 is a schematic diagram of a power system 300 in some embodiments of the present disclosure. In FIG. 3, the similar components associated with the embodiment of FIG. 1 are labeled with the same numerals for ease of understanding. The specific principle of the similar component has been explained in detail in the previous paragraphs, and unless it has a cooperative relationship with the components of FIG. 3, it is not repeated here.

The power system 300 includes a power conversion circuit 310, DC converters 320A-320C, a controller 330 and inverters 340A-340B. The power conversion circuit 310 is respectively coupled to the AC supply line LAC and the DC supply line LDC. In some embodiments, the power conversion circuit 310 can be a bidirectional AC+DC converter, which is configured to convert the voltage between the AC supply line LAC and the DC supply line LDC to transmit the AC voltage or the DC voltage.

The DC converters 320A-320C is coupled to the power conversion circuit 310 through the DC supply line LDC, and each DC converters 320A-320C can be connected to at least one charging device (multiple charging devices CS1, CS2)

and/or a renewable energy device SP (e.g., solar panels). The DC converters 320A-320C is configured to convert the voltage between the DC supply line LDC and the charging devices CS1, CS2 and the renewable energy device SP, so as to provide a voltage that matches the requirements of the charging devices CS1, CS2, or to convert an inductive power generated by the renewable energy device SP into a transmission specification that matches the DC supply line LDC.

The inverters 340A-340B are coupled to the AC supply line LAC, and are coupled to the charging devices CS1, CS2 through power transmission lines, so as to form a power recovery path. When the charging devices CS1, CS2 output the supply power to the inverters 340A-340B, the inverters 340A-340B are configured to convert the supply power into the recovered power, and transmit the recovered power back to the power conversion circuit 310 to complete power recovery.

The controller 330 is coupled to the power conversion circuit 310, the DC converters 320A-320C and the inverters 340A-340B. The controller 330 is configured to control the power conversion circuit 110 to stabilize the DC voltage V2 of the DC supply line LDC according to the AC voltage V1, to enable the DC converters 120A-120C output power or receive power.

In some embodiments, the controller 330 is further coupled to the charging devices CS1, CS2, and is configured to receive a charging test data from each inverters 340A-340B or each charging devices CS1, CS2. The charging test data includes a voltage change or a current change of each inverters 340A-340B or each charging devices CS1, CS2 during a detection period. The controller 330 determines whether the power management of the power system 300 matches a standard by analyzing the charging test data, or evaluates whether the charging performance of the charging devices CS1 and CS2 matches expectations. For example, when the charging devices CS1 and CS2 operate at full load, the controller 330 detects whether a power regulation mechanism of the power system 300 is normal, or detects whether a voltage protection mechanism of the power system 300 operates normally.

In some embodiments, the power system 300 further includes an uninterruptible power supply device UPS and an energy storage device 350. The uninterruptible power supply device UPS is coupled to the AC supply line LAC and the controller 330. The energy storage device 350 is coupled to the DC supply line LDC, the controller 330 and the uninterruptible power supply device UPS, and includes multiple bidirectional converters 351A-351B (e.g., bidirectional DC-DC conversion circuit) and multiple batteries BT1-BT2.

As mentioned above, the uninterruptible power supply device UPS has an internal battery that can be charged during normal operation of the power system 300. When the power system 300 does not receive stable power supply, the controller 330 is driven according to the uninterruptible power supply device UPS. Then, the driven controller 330 will activate the energy storage device 350 to establish the DC voltage on the DC supply line LDC according to the power (electric energy) in the energy storage device 350, and then drive the power conversion circuit 310 accordingly.

In addition, after the power conversion circuit 310 is driven according to the DC voltage of the DC supply line LDC, the power conversion circuit 310 will establish the AC voltage on the AC supply line LAC. Next, the power conversion circuit 310 provides power to the DC converters 320A-320C. The timing of using the uninterruptible power supply device UPS to drive/activate the controller 330 will be explained in subsequent paragraphs.

The power system 300 of the present disclosure can have different control methods according to different usage conditions. The following will use FIG. 4 and FIG. 5 to illustrate the control methods when the power system 300 operates in "On-Grid" and "Off-Grid" respectively.

FIG. 4 is a flowchart illustrating a power control method in some embodiments of the present disclosure, which is applied to an "On-Grid" state. In other words, the power system 300 establishes a stable AC voltage by the mains power grid GD.

In step S401, the switches W31 and W32 corresponding to the mains power grid GD and the power conversion circuit 310 in the power system 300 will be turned on (e.g., controlled by the controller 330), so that the power conversion circuit 310 receives a mains voltage through the AC supply line LAC. When the mains power grid GD is stable, the mains voltage can form a stable AC voltage on the AC supply line LAC. At this time, other switches W33-W36 remain off.

In step S402, the power conversion circuit 310 establishes a DC voltage on the DC supply line LDC according to the mains voltage (or the AC voltage). The power conversion circuit 310 outputs a fixed voltage as the DC voltage according to the AC voltage to stabilize the DC supply line LDC.

In step S403, after the DC voltage is established on the DC supply line LDC, and the AC voltage and the DC voltage are both stable, the controller 330 activates/drives the DC converters 320A-320C. The DC converters 320A-320C receive the DC voltage to output power to the charging devices CS1, CS2.

In some embodiments, the controller 330 is further configured to transmit the charging power data to the charging devices CS1, CS2. "The charging power data" is configured to limit the charging power of each or all charging devices CS1, CS2. For example, the charging power data includes an upper limit of the output power of charging devices CS1 and CS2 (e.g., the upper limit of the power of each device, or the upper limit of the total power), or includes an operating voltage/current range of charging devices CS1 and CS2. The charging devices CS1 and CS2 can be installed with different charging programs to selectively use fast charging or normal power supply mode. The charging method of the charging device will be apparent to those of ordinary skill in the art in view of the teachings herein, which will not be described here.

In step S404, the switches W33-W35 in the power system 300 corresponding to the AC supply line LAC and the inverters 340A-340B will be turned on (e.g., controlled by the controller 330), and the inverters 340A-340B will be connected to the charging devices CS1, CS2, to form a power recovery path. At this time, the charging devices CS1 and CS2 provide the supply power to the corresponding inverters 340A-340B. The inverters 340A-340B convert the supply power into a recovered power, and transmit the recovered power to the power conversion circuit 310 through the AC supply line LAC to realize power recovery.

In step S405, after a power recovery path is formed, the controller 330 receives a charging test data from the inverters 340A-340B or the charging devices CS1 and CS2 to determine whether the power supply performance of the charging devices CS1 and CS2 matches expectations. In other embodiments, the controller 330 can detect/determine whether the voltage on the AC supply line LAC or the DC supply line LDC is stable at any time to confirm whether the operation of the power system 300 is normal.

FIG. 5 is a flowchart illustrating a power control method in some embodiments of the present disclosure, which is applied to an "Off-Grid" state. In other words, the power system 300 establishes a stable AC voltage by itself.

In step S501, a switch W31 corresponding to the AC supply line LAC and the mains power grid GD (i.e., between the AC supply line LAC and the mains power grid GD) in the power system 300 is turned off, and the power system 300 will establish a stable DC voltage and/or a stable AC voltage by itself. The "off-grid" state is applied when the mains power grid GD is interrupted or unstable. In one embodiment, "on-grid" and "off-grid" are two different independent operation modes, but the present disclosure is not limited to this. The power system 300 can switch between "on-grid" and "off-grid" according to preset conditions.

In some embodiments, the switch W31 can be actively turned off by the controller 330 to set the power system to an off-grid state. In other embodiments, when the mains power grid GD provides the mains voltage to the AC supply line LAC as an AC voltage, the controller 330 detects the mains voltage (the AC voltage) on the AC supply line LAC instantly or periodically. When the mains voltage or the AC voltage is unstable (e.g., variation range exceeds a preset value, or the AC voltage is lower than a preset value), or when the AC supply line LAC or the DC supply line LDC becomes unstable due to unstable power supply of the mains power grid, the controller 330 turns off the switch W31 between the AC supply line LAC and the mains power grid GD, so that the power system 300 switches from the on-grid state to the off-grid state.

In step S502, the AC supply line LAC has not yet established a stable AC voltage, so switches W32-W36 remain off. The uninterruptible power supply device UPS will be triggered when it does not receive the AC voltage, and drive the controller 330 (e.g., provides power to a power supply 331 of the controller 330). When the controller 330 is driven according to the uninterruptible power supply device UPS, the controller 330 will activate/drive the energy storage device 350, so as to using the power of the energy storage device 350 to establish the DC voltage on the DC supply line LDC. Next, the power conversion circuit 310 is driven by the DC voltage of the DC supply line LDC and the controller 330.

In step S503, when the power conversion circuit 310 is activated, a switch W32 in the power system 300 corresponding to the AC supply line LAC and the power conversion circuit 310 will be turned on, the power conversion circuit 310 establishes the AC voltage on the AC supply line LAC according to the DC voltage of the DC supply line LDC, and stabilizes the AC voltage.

In step S504, after the AC voltage of the AC supply line LAC is established, a switch W36 in the power system 300 corresponding to the AC supply line LAC and the uninterruptible power supply device UPS will be turned on. In addition, after the AC voltage and the DC voltage are both stable, the controller 330 will activate the DC converters 320A-320C. The DC converters 320A-320C receive the DC voltage to output power to the charging devices CS1, CS2. At this time, the switches W33-W35 remain off.

As mentioned above, the controller 330 may further transmit a charging power data to the charging devices CS1, CS2 to limit a charging power of the charging devices CS1, CS2.

In step S505, multiple switches W33-W35 in the power system 300 corresponding to the AC supply line LAC and the inverters 340A-340B are turned on (e.g., controlled by the controller 330), and the inverters 340A-340B are connected to the charging devices CS1, CS2, to form a power recovery path. At this time, the charging devices CS1 and CS2 provide the supply power to the corresponding inverters 340A-340B. The inverters 340A-340B convert the supply power into a recovered power, and transmit the recovered power to the power conversion circuit 310 through the AC supply line LAC to realize power recovery.

Furthermore, after the DC converters 320A-320C are activated, the DC converter 320C can further receive the charging power from the renewable energy device SP, and provide the charging power to the DC supply line LDC.

In step S506, after a power recovery path is formed, the controller 330 receives the charging test data from the inverters 340A-340B or the charging devices CS1 and CS2, so as to determine whether the power supply performance of the charging devices CS1 and CS2 matches expectations. In other embodiments, the controller 330 can detect/determine whether the voltage on the AC supply line LAC or the DC supply line LDC is stable at any time to confirm whether the operation of the power system 300 is normal.

As mentioned above, the power system 300 is connected to the charging devices CS1 and CS2 through the inverters 340A-340B, so as to form the power recovery path on the DC side, and then transmit the recovered power back to the AC side. Accordingly, power can be recycled in the power system 300. The power system 300 only needs to draw a small amount of power from the mains power grid GD to simulate an actual operating state to confirm whether the power grid is operating normally.

In addition, during the simulation, the controller 330 of the power system 300 can further plan a charging schedule to use the inverters 340A-340B to simulate different charging requirements (e.g., controlling the charge amount provided to electric vehicles by charging stations), and test a plan that is most beneficial to power grid configuration.

In some embodiments, the power system 300 may be applied as a microgrid with megawatt (MW) power. Under a normal condition, the power system 300 operates in the on-grid state; if an abnormality occurs in the mains power grid GD, the power system 300 will disconnect (turn off, shut down) a connection between the power system 300 and the mains power grid GD, and change to operate in the off-grid state to maintain power supply to the load.

The elements, method steps, or technical features in the foregoing embodiments may be combined with each other, and are not limited to the order of the specification description or the order of the drawings in the present disclosure.

It will be apparent to those skilled in the art that various modifications and variations can be made to the structure of the present disclosure without departing from the scope or spirit of the present disclosure. In view of the foregoing, it is intended that the present disclosure cover modifications and variations of this present disclosure provided they fall within the scope of the following claims.

What is claimed is:

1. A power system, comprising:
   a power conversion circuit coupled to an AC supply line and a DC supply line, and configured to convert a voltage between the AC supply line and the DC supply line;
   at least one DC converter coupled to the power conversion circuit through the DC supply line, and coupled to at least one charging device, wherein the at least one DC converter is configured to output a working voltage that matches a working voltage of the at least one charging device;

at least one inverter coupled to the AC supply line and the at least one charging device, wherein when the at least one charging device provides a supply power to the at least one inverter, the at least one inverter is configured to convert the supply power into a recovered power and transmit the recovered power to the power conversion circuit; and a controller coupled to the at least one DC converter and the at least one inverter, and configured to transmit a charging power data to the at least one charging device, wherein the charging power data is configured to limit a charging power of the at least one charging device.

2. The power system of claim 1, wherein the controller is coupled to the power conversion circuit and the at least one charging device, and is configured to receive a charging test data from the at least one inverter or the at least one charging device.

3. The power system of claim 2, wherein the charging test data comprises a voltage change or a current change of the at least one inverter or the at least one charging device during a detection period.

4. The power system of claim 2, wherein the controller is configured to turn on a switch on the AC supply line, so that the power conversion circuit receives a mains voltage through the AC supply line, and establishes a DC voltage on the DC supply line according to the mains voltage.

5. The power system of claim 2, further comprises:

an uninterruptible power supply device coupled to the AC supply line and the controller, wherein the controller is driven by the uninterruptible power supply device; and an energy storage device coupled to the DC supply line and the controller, wherein the controller is configured to establish a DC voltage on the DC supply line through the energy storage device to drive the power conversion circuit;

wherein after the DC voltage is established on the DC supply line, the power conversion circuit is configured to establish an AC voltage on the AC supply line according to the DC voltage.

6. The power system of claim 5, wherein the controller is further configured to determine whether a mains voltage on the AC supply line is stable, and when the mains voltage is not stable, the controller is configured to turn off a switch between the AC supply line and a mains power grid.

7. The power system of claim 1, wherein the power system comprises a plurality of DC converters, one of the plurality of DC converters is coupled to a renewable energy device to receive a charging power from the renewable energy device.

8. A power control method, comprising:

stabilizing, by a power conversion circuit, a DC voltage of a DC supply line according to an AC voltage of an AC supply line, and transmitting the DC voltage to at least one DC converter, wherein the at least one DC converter is configured to convert the DC voltage and provide a working voltage that matches a working voltage of at least one charging device to the at least one charging device;

transmit, by a controller, a charging power data to the at least one charging device, wherein the charging power data is configured to limit a charging power of the at least one charging device;

connecting at least one inverter to the at least one charging device to receive a supply power outputted by the at least one charging device; and converting, by the at least one inverter, the supply power to a recovered power, and transmitting the recovered power to the power conversion circuit through the AC supply line.

9. The power control method of claim 8, further comprising:

receiving, by the controller, a charging test data from the at least one inverter or the at least one charging device, wherein the charging test data comprises a voltage change or a current change of the at least one inverter or the at least one charging device during a detection period.

10. The power control method of claim 9, further comprising:

turning on a switch of the AC supply line, so that the power conversion circuit receive a mains voltage through the AC supply line; and establishing the DC voltage on the DC supply line according to the mains voltage.

11. The power control method of claim 9, further comprising:

driving the controller by an uninterruptible power supply device;

using, by the controller, a power of an energy storage device to establish the DC voltage on the DC supply line to drive the power conversion circuit; and establishing, by the power conversion circuit, the AC voltage on the AC supply line according to the DC voltage.

12. The power control method of claim 9, further comprising:

determining, by the controller, whether a mains voltage on the AC supply line is stable; and when the mains voltage is not stable, turning off a switch between the AC supply line and a mains power grid.

13. The power control method of claim 8, wherein connecting the at least one inverter to the at least one charging device to receive the supply power outputted by the at least one charging device comprises:

after the DC voltage of the DC supply line and the AC voltage of the AC supply line are both stable, turning on a switch on the AC supply line to connect the at least one inverter between the at least one charging device and the AC supply line.

14. A power system, comprising:

a power conversion circuit coupled to an AC supply line and a DC supply line, and configured to convert a voltage between the AC supply line and the DC supply line;

a plurality of DC converters coupled to the power conversion circuit through the DC supply line, and coupled to at least one charging device, wherein the plurality of DC converters is configured to output a working voltage that matches a working voltage of the at least one charging device;

a controller coupled between the power conversion circuit and the plurality of DC converters, wherein when an AC voltage is established on the AC supply line, the controller is configured to control the power conversion circuit to stabilize a DC voltage on the DC supply line according to the AC voltage, so as to output or receive power by the plurality of DC converters;

wherein the controller is further configured to transmit a charging power data to the at least one charging device, wherein the charging power data is configured to limit a charging power of the at least one charging device;

an uninterruptible power supply device coupled to the AC supply line and the controller, wherein the controller is driven by the uninterruptible power supply device; and an energy storage device coupled to the DC supply line and the controller, wherein the controller is configured to establish the DC voltage on the DC supply line through the energy storage device to drive the power conversion circuit;

wherein after the DC voltage is established on the DC supply line, the power conversion circuit is configured to establish an AC voltage on the AC supply line according to the DC voltage.

15. The power system of claim 14, wherein the power system further comprises:

an inverter coupled to the AC supply line and the at least one charging device, wherein when the at least one charging device provides a supply power to the inverter, the inverter is configured to convert the supply power into a recovered power and transmit the recovered power to the power conversion circuit.

16. The power system of claim 15, wherein the controller is configured to receive a charging test data from the inverter or the at least one charging device, and the charging test data comprises a voltage change or a current change of the inverter or the at least one charging device during a detection period.

17. The power system of claim 14, wherein the controller is configured to turn on a switch on the AC supply line, so that the power conversion circuit receives a mains voltage through the AC supply line, and establishes the DC voltage on the DC supply line according to the mains voltage.

* * * * *